(12) United States Patent
Matsuyama et al.

(10) Patent No.: US 6,387,005 B1
(45) Date of Patent: May 14, 2002

(54) HYDRAULIC DRIVE APPARATUS FOR WORKING MACHINE

(75) Inventors: Nobuo Matsuyama, Sakado; Masanori Ikari; Toshio Uchimura, both of Sayama, all of (JP)

(73) Assignee: Komatsu, Ltd., Tokyo (JP)

( * ) Notice: Subject to any disclaimer, the term of this patent is extended or adjusted under 35 U.S.C. 154(b) by 47 days.

(21) Appl. No.: 09/662,008

(22) Filed: Sep. 14, 2000

(30) Foreign Application Priority Data

Sep. 16, 1999 (JP) ............................................ 11-262268
Oct. 5, 1999 (JP) ............................................ 11-284050

(51) Int. Cl.[7] ............................................. F16H 47/10
(52) U.S. Cl. ........................................................ 475/75
(58) Field of Search ............................. 475/78, 84, 75, 475/83, 80, 82

(56) References Cited

U.S. PATENT DOCUMENTS 4,121,479 A * 10/1978 Schauer ........................ 74/687

5,709,628 A * 1/1998 Pidde et al. .................. 475/75

FOREIGN PATENT DOCUMENTS

JP 2000-193065 7/2000

* cited by examiner

*Primary Examiner*—Rodney H. Bonck
*Assistant Examiner*—Eric M. Williams
(74) *Attorney, Agent, or Firm*—Armstrong, Westerman & Hattori, LLP (57) ABSTRACT

The invention provides a hydraulic drive apparatus which obtain a desired speed reduction ratio and a reduced shock during clutch engagement. Accordingly, the hydraulic drive apparatus for a working machine has a variable capacity type first (8) and second hydraulic motor (11), a first input shaft (5) and a second input shaft connected respectively (7). The hydraulic drive apparatus transmits a torque from the first and the second hydraulic motor to an output shaft (2). A planetary gear (21) is interposed between the second hydraulic motor and the second input shaft, and a clutch (10) freely engaging the second hydraulic motor with the second input shaft is provided between a ring gear (29) of the planetary gear and a housing (24). A modulation damper (22) for reducing a clutch pressure (P3) before the engagement and reducing at a time of engagement is provided.

7 Claims, 6 Drawing Sheets

HYDRAULIC DRIVE APPARATUS FOR WORKING MACHINE

FIELD OF THE INVENTION

The present invention relates to a hydraulic drive apparatus for a working machine which transmits an output torque of a plurality of hydraulic motors to an output shaft.

BACKGROUND OF THE INVENTION

In conventional, in a working machine such as a wheel loader or the like, there has been known a hydraulic drive apparatus which transmits an output torque of a plurality of hydraulic motors to an output shaft.

Figure 9:
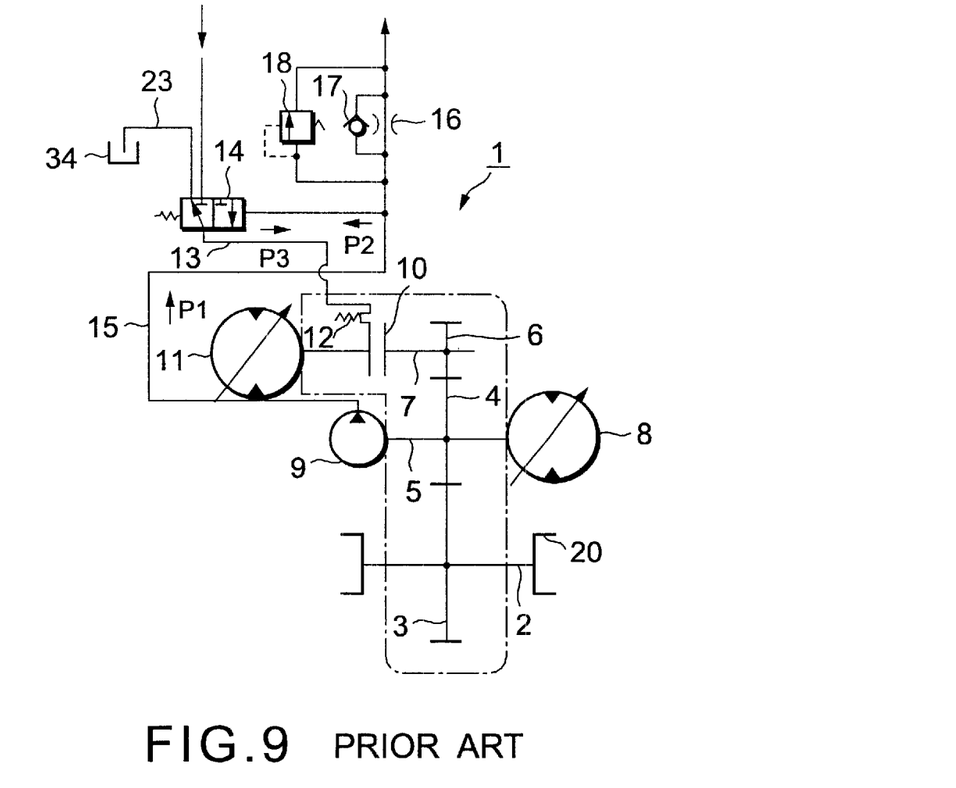
FIG. 9 is a skeleton view of a hydraulic drive apparatus in accordance with a conventional art.

FIG. 9 is a skeleton view of a hydraulic drive apparatus disclosed in Unexamined Japanese Patent Publication No. 2000-193065. In FIG. 9, a hydraulic drive apparatus 1 is provided with an output shaft 2 connected to a load 20, an output gear 3 adhered to the output shaft 2, a first input gear 4 engaged with the output gear 3, a first input shaft 5 to which the first input gear 4 is adhered, a second input gear 6 engaging with the first input gear 4, and a second input shaft 7 to which the second input gear 6 is adhered. The output gear 3, the first input gear 4 and the second input gear 6 are respectively spur gears.

A first hydraulic motor 8 having a high vehicle speed and a low torque and a control pump 9 are respectively connected to one end side portion of the first input shaft 5 and another end side portion thereof. Further, a second hydraulic motor 11 having a low vehicle speed and a high torque is connected to an axial end portion of the second input shaft 7 via a clutch 10.

The first hydraulic motor 8 and the second hydraulic motor 11 are connected to a hydraulic pump (not shown) via a hydraulic parallel circuit and are driven by a discharged pressurized oil thereof.

The clutch 10 is normally in an engaging state due to an urging force of a spring 12 and is broken down in accordance that a clutch oil pressure P3 supplied from an oil pressure source via an oil passage 13 becomes greater than the urging force. The clutch oil pressure P3 is controlled to be supplied or broken down by a two position switching valve 14 interposed in the oil passage 13.

An orifice 16, a check valve 17 and a relief valve 18 are arranged in parallel in a discharged oil passage 15 of the control valve 9. When an oil pressure P1 of the discharged oil passage 15 detected by the orifice 16 is over a set oil pressure, a pilot pressure is supplied to the two position switching valve 14 and the two position switching valve 14 is opened, whereby the clutch oil pressure is applied and the clutch 10 is broken down.

At a time of low speed traveling, the clutch 10 is in an engaging state, both of the first hydraulic motor 8 and the second hydraulic motor 11 are connected to the output shaft 2, thereby driving the load 20 at a high torque. Further, at a time of high speed traveling, a discharge amount of the control pump 9 is increased in accordance with an increase of a rotational number of the first hydraulic motor 8. Further, when the oil pressure of the discharged oil passage 15 detected by the orifice 16 becomes over the set oil pressure, a pilot pressure P2 is supplied to the two position switching valve 14. Accordingly, the two position switching valve 14 is opened, the clutch 10 is broken down in accordance with the clutch oil pressure P3, and the torque is transmitted to the output shaft 2 from only the first hydraulic motor 8, thereby driving the load at a high speed.

Further, at a time of changing to the low speed traveling from the high speed traveling, the discharge amount of the control pump 9 is reduced in correspondence to a reduction of the rotational speed of the first hydraulic motor 8. Accordingly, the pilot pressure P2 supplied to the two position switching valve 14 is reduced and the two position switching valve 14 is closed. As a result, the clutch oil applied to the clutch 10 at the clutch pressure P3 passes to a drain 34 through a drain line 23 from the two position switching valve 14, and the clutch pressure P3 is reduced to be lower than the urging force of the spring 12, whereby the clutch 10 in a broken state is engaged due to the urging force.

However, in accordance with the prior art mentioned above, there are the following problems.

That is, in accordance with an arrangement of the prior art, the spur gear is used for the output shaft 2, and the first input shaft 5 and the second input shaft 7 are connected thereto. In the spur gear, it is necessary to largely change a size between axes and an outer diameter in order to change a speed reduction ratio, so that a freedom of setting a speed reduction gear of the first and second hydraulic motors 8 and 11 with respect to the output shaft 2 is low. Accordingly, there is a problem that it is hard to set an optimum speed reduction ratio with respect to each of the hydraulic motors 8 and 11.

Further, since the second input shaft 1 is connected to the output shaft 2 via the first input shaft 5, it is necessary to arrange a center axis of the first input shaft 5 in a left portion (or a right portion) of a center axis of the output shaft 2 and arrange a center axis of the second input shaft 7 in a further left portion (or a further right portion) thereof, so that the hydraulic drive apparatus is shifted in a lateral direction. Accordingly, in a working vehicle in which it is necessary to arrange the output shaft 2 at a substantially center in a lateral direction of the vehicle, for example, an articulate type working vehicle, there is a problem that a size of the hydraulic drive apparatus 1 in a lateral direction of the vehicle is increased and it is hard to mount in the working vehicle.

Further, since the second hydraulic motor 11 is connected onto the second input shaft 7 via the clutch 10, the second input gear 6 and the clutch 10 are coaxially arranged, and an axial length of the second input shaft 7 is increased. Accordingly, there is a problem that the size of the hydraulic drive apparatus 1 is caused to be increased.

Further, since the clutch 10 is provided in the second input shaft 7 having a high peripheral speed, a difference of the rotational numbers between both side of the clutch 10 is large at a time of engaging the clutch 10. Accordingly, there is a problem that an abrasion is easily generated in the clutch 10 and a shock is great at a time of engaging.

Figure 10:
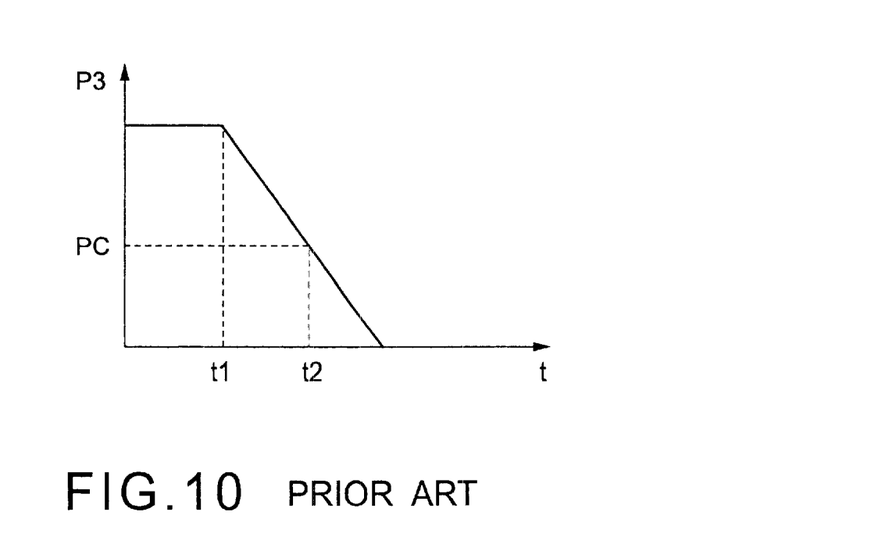
FIG. 10 is a graph showing a change with the passage of time of a clutch pressure in accordance with the conventional art.

Here, FIG. 10 shows a change with the passage of time of the clutch pressure P3 at a time of changing from the high speed traveling to the low speed traveling. The clutch oil applied to the clutch 10 from a time t1 when the two position switching valve 14 is opened passes to the drain 34 at a substantially fixed flow rate through the two position switching valve 14 and the drain line 23. In accordance therewith, the clutch pressure P3 is reduced in accordance a with a substantially fixed incline, and the clutch 10 is engaged at a time t2 when the clutch pressure P3 reaches a predetermined pressure PC.

At this time, when reducing a flow rate at which the clutch oil passes to the drain 34, a long time is required for engaging the clutch 10, so that the working vehicle can not obtain a torque required at a desired timing and a travel and an operation become unstable. Accordingly, it is necessary to set the flow rate at which the clutch oil passes to a level equal to or more than a predetermined flow rate.

However, when setting the flow rate at which the clutch oil passes to the level equal to or more than the predetermined flow rate, the clutch pressure P3 is suddenly reduced and a magnitude thereof becomes smaller than the urging force of the spring 12, so that the clutch 10 is suddenly engaged. Accordingly, a great engagement shock is generated at a time of engaging the clutch 10, whereby an uncomfortable ride of the working vehicle is generated, and a load is applied to the clutch 10 due to the sudden engagement, whereby a service life of the clutch 10 is reduced.

That is, in accordance with the prior art, there is a problem that there is no means for softening the shock at a time of engaging the clutch.

SUMMARY OF THE INVENTION

The present invention is made by paying attention to the problems mentioned above, and an object of the present invention is to provide a hydraulic drive apparatus which can obtain a desired speed reduction ratio, is compact and has a small shock at a time of engaging.

In order to achieve the object mentioned above, in accordance with a first aspect of the present invention, there is provided a hydraulic drive apparatus for a working machine having, variable capacity type first hydraulic motor and second hydraulic motor, a first input shaft connected to the first hydraulic motor, and a second input shaft freely engaged with the second hydraulic motor, the hydraulic drive apparatus transmitting an output torque of the first hydraulic motor and the second hydraulic motor to an output shaft, wherein the output shaft is connected to the first input shaft, the output shaft is connected to the second input shaft respectively via a train of gears, a planetary gear is interposed between the second hydraulic motor and the second input shaft, and a clutch freely engaging the second hydraulic motor with the second input shaft is provided between the second hydraulic motor and the planetary gear.

In accordance with the first aspect of the present invention, the first input shaft is connected to the output shaft and the second input shaft are connected to the output shaft, respectively without disposing the other shaft therebetween. Accordingly, it is possible to independently set a speed reduction ratio of the first input shaft and the second input shaft with respect to the output shaft, respectively. Accordingly, for example, since it is possible to set a speed reduction ratio respectively suitable for the first hydraulic motor having a high vehicle speed and a low torque and the second hydraulic motor having a low vehicle speed and a high torque, a torque transmitting efficiency of the hydraulic motor is improved and a drive efficiency of the working vehicle is improved.

Further, the planetary gear is interposed between the second hydraulic motor and the second input shaft. Accordingly, since the speed reduction ratio from the second hydraulic motor to the output shaft is increased, a great torque is generated, so that it is possible to make the second hydraulic motor compact. Further, since the planetary gear can change the speed reduction ratio without largely changing an outer diameter, the planetary gear can set an optimum speed reduction ratio with respect to the hydraulic motor within a limited internal space of the working vehicle. For example, even when the specification of the existing hydraulic motor does not have a torque characteristic required for the working vehicle, a desired torque can be obtained.

Further, the clutch freely engaging the second hydraulic motor with the second input shaft is provided between the second hydraulic motor and the planetary gear. Accordingly, it is possible to damp a shock generated at a time of engaging the clutch. For example, when the clutch is provided between a ring gear and a housing of the hydraulic drive apparatus, a difference of speed with respect to the housing becomes small since the ring gear has a low peripheral speed, so that an abrasion generated at a time of engaging the clutch becomes small and a service life of the clutch becomes long. Further, since the difference of speed at a time of engaging the clutch is small, an engaging shock becomes small and a comfortable feeling for driving in improved.

In accordance with a second aspect of the present invention, there is provided a hydraulic drive apparatus for a working machine as cited in the first aspect, wherein center axes of the first input shaft and the second input shaft are arranged in left and right upper portions of the center axis of the output shaft in a symmetrical manner.

In accordance with the second aspect of the present invention, with respect to the output shaft arranged at a substantially center portion in a lateral direction of the working vehicle, the first and second input shafts are respectively arranged in left and right upper portions of the output shaft in a substantially symmetrical manner. Accordingly, the hydraulic drive apparatus is not shifted with respect to the center in the lateral direction of the working vehicle, a weight balance in the lateral direction is improved. Further, since a size of the hydraulic drive apparatus with respect to the center of the working vehicle is equalized, it becomes easy to receive the hydraulic drive apparatus within the working vehicle.

In accordance with a third aspect of the present invention, there is provided a hydraulic drive apparatus for a working machine as cited in the first aspect, wherein a lubricating oil port for taking in a lubricating oil is provided in an end portion of the second input shaft opposite to the second hydraulic motor.

In accordance with the third aspect of the present invention, the lubricating oil port is provided in the second input shaft, and the lubricating oil is taken in therefrom so as to lubricate the planetary gear. Accordingly, in comparison with lubricating means structured such as to soak the planetary gear within an oil tank, a drive force loss at a time when the planetary gear mixes the lubricating oil within the oil tank is reduced, and an energy efficiency of the working vehicle is improved.

In accordance with a fourth aspect of the present invention, there is provided a hydraulic drive apparatus for a working machine as cited in the first, second or third aspect, wherein the clutch is a negative clutch and a modulation damper for preventing a clutch oil pressure from being suddenly taken out is provided in a drain line for taking out the clutch oil pressure of the clutch.

In accordance with the fourth aspect of the present invention, the clutch is set to the negative clutch. Accordingly, since the clutch is always in an engaging state even in the case that the engine and the hydraulic pump stop during the travel, the hydraulic pump becomes a brake so as to reduce the speed of the working vehicle.

Further, the modulator damper for preventing the clutch oil pressure from being suddenly taken out is provided in the drain line for taking out the clutch oil pressure of the clutch. Accordingly, the clutch is not suddenly engaged and the shock at a time of engaging is reduced, whereby a ride feeling of the working vehicle is improved.

In accordance with a fifth aspect of the present invention, there is provided a hydraulic drive apparatus for a working machine as cited in the first or second aspect, wherein a control pump for controlling the clutch oil pressure is connected to an end portion of the first input shaft opposite to the first hydraulic motor.

In accordance with the fifth aspect of the present invention, the control pump for controlling the clutch oil pressure is connected to the first input shaft for connecting the first hydraulic motor. Accordingly, since a shaft or a gear for driving the control pump is not independently required, the structure of the hydraulic drive apparatus for the working machine becomes simple and compact.

In accordance with a sixth aspect of the present invention, there is provided a hydraulic drive apparatus for a working machine having, first hydraulic motor and second hydraulic motor, a first Input shaft connected to the first hydraulic motor, a second input shaft connected to the second hydraulic motor so as to be freely engaged by a clutch being controlled by a switching valve, and an output shaft connected to the first input shaft and the second input shaft via a gear train, the hydraulic drive apparatus transmitting an output torque of the first hydraulic motor and the second hydraulic motor to the output shaft, wherein a modulation damper for suddenly reducing the clutch pressure before engagement and slowly reducing the clutch pressure at a time of engagement is provided in a drain line of the switching valve.

In accordance with the sixth aspect of the present invention, the modulation damper for slowly reducing the clutch pressure is provided in the drain line for taking out the clutch pressure of the clutch.

Accordingly, since the clutch pressure is slowly reduced before the clutch is engaged, a magnitude of the clutch pressure and a magnitude of the spring urging force are gradually close to each other, and the clutch is not suddenly engaged. Therefore, a shock at a time of engagement can be reduced, a service life of the clutch can be increased, and a ride feeling of the working vehicle can be improved. Further, since the structure is made such that the clutch pressure is suddenly reduced before the clutch is engaged, a long time is not required before the clutch is engaged, so that it is possible to engage the clutch at a desired timing. Accordingly, no trouble is generated for traveling the working vehicle, and a stable operation can be performed.

In accordance with a seventh aspect of the present invention, there is provided a hydraulic drive apparatus for a working machine as cited in the sixth aspect, further comprising a control pump driven by the first hydraulic motor via the first input shaft or the gear train, and a two position switching valve for controlling an engagement of the clutch on the basis of an oil pressure discharged by the control pump.

In accordance with the seventh aspect of the present invention, the control pump for controlling the clutch pressure is driven by the first hydraulic motor, and the engagement and disengagement of the clutch is controlled by the oil pressure discharged from the control pump. Accordingly, the hydraulic drive apparatus controls the engagement and disengagement of the clutch in correspondence to the rotational speed of the first hydraulic motor, that is, the speed of the working vehicle, so that it is possible to always control the clutch at a timing suitable for the travel of the working vehicle.

Further, since it is possible to constitute the hydraulic drive apparatus only by the hydraulic circuit and an electrical control system such as a controller or the like is not required, the structure of the hydraulic drive apparatus for the working machine can be made simple and compact.

BEST MODE FOR CARRYING OUT THE INVENTION

A description will be in detail given of a first embodiment in accordance with the present invention with reference to the accompanying drawings. In this case, in the present embodiment, the same reference numerals are attached to the same elements as those used in the drawings for describing the conventional art, and an overlapping explanation will be omitted.

Figure 1:
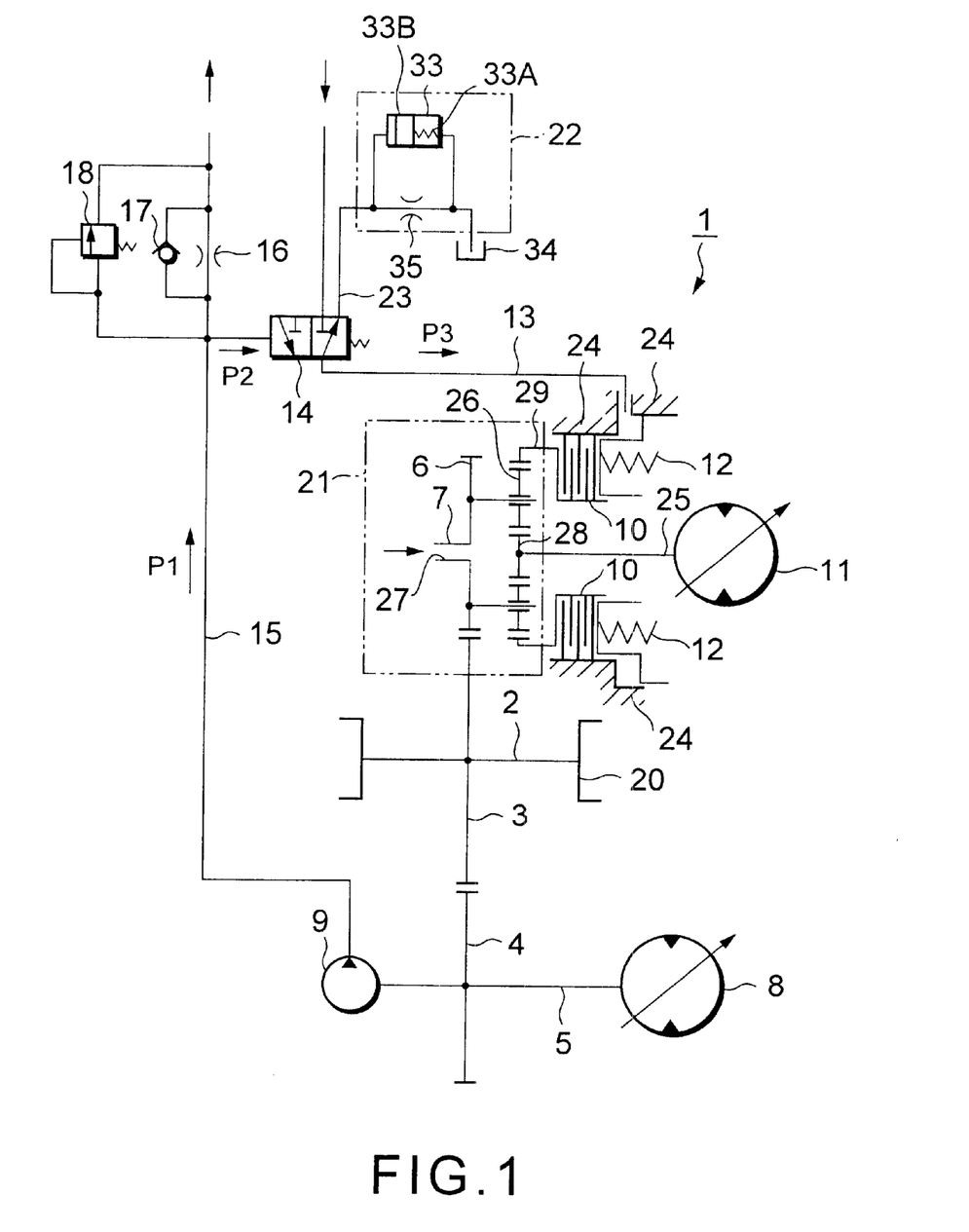
FIG. 1 is a skeleton view of a hydraulic drive apparatus in accordance with a first embodiment.

FIG. 1 is a skeleton view of a hydraulic drive apparatus in accordance with the present embodiment.

In FIG. 1, a hydraulic drive apparatus 1 is provided with an output shaft 2 connected to a load 20, an output gear 3 adhered to the output shaft 2, a first input gear 4 engaged with the output gear 3, a first input shaft 5 to which the first input gear 4 is adhered, a second input gear 6 engaging with the output gear 3, and a second input shaft 7 to which the second input gear 6 is adhered.

A first hydraulic motor 8 having a high vehicle speed and a low torque and a control pump 9 are respectively connected to one end side portion of the first input shaft 5 and another end side portion thereof.

The second input shaft 7 and the second hydraulic pump are connected via a planetary gear 21, and the planetary gear 21 is structured such as to be freely engaged by a clutch 10.

That is, a second hydraulic motor 11 is connected to a sun gear shaft 25 adhered to a sun gear 28 of the planetary gear 21. The second input gear 6 constituting a planet carrier is connected to a plurality of planetary gears 26 engaged with the sun gear 28. A ring gear 29 is engaged with the planetary gears 26, and the ring gear 29 is engageably connected to a housing 24 of the hydraulic drive apparatus 1 via the clutch 10.

Further, the second input gear 6 is arranged in one end portion of the second input shaft 7, and a lubricating oil port 27 for introducing a lubricating oil of the planetary gear 21 is provided in another end portion.

At this time, the first hydraulic motor 8 and the second hydraulic motor 11 are connected to a hydraulic pump (not shown) via a hydraulic parallel circuit and are driven by a discharged pressurized oil thereof.

A two position switching valve 14 is interposed in the oil passage 13 so as to control to supply and shut down a clutch oil pressure P3 supplied from an oil pressure source (not shown) via the oil passage 13. The clutch 10 is a negative clutch, is normally in an engaged state due to an urging force of the spring 12 and is broken when the clutch oil pressure P3 is over the urging force of the spring 12.

The control pump 9 is driven by the first hydraulic motor 8 via the first input shaft 5 and discharges an oil pressure P1 having a positive relation to the rotational number of the first hydraulic motor 8 to a discharge oil passage 15.

An orifice 16, a check valve 17 and a relief valve 18 are arranged in parallel in the discharged oil passage 15. When the rotational number of the first hydraulic motor 8 is increased and the oil pressure P1 of the discharged oil passage 15 detected by the orifice 16 is over a set oil pressure, a pilot pressure P2 is supplied to the two position switching valve 14 and the two position switching valve 14 is opened, whereby the clutch 10 is broken down due to the clutch oil pressure P3.

Further, when the rotational number of the first hydraulic motor 8 is reduced and a pilot pressure P2 supplied to the two position switching valve 14 is weakened, the clutch pressure P3 is reduced and the clutch 10 is engaged by being pressed by the urging force of the spring 12. At this time, the clutch oil is taken out from the oil passage 13 to a drain 34 via a drain line 23. A modulation damper 22 provided with an orifice 35 and a cylinder having a spring 33A and a piston 33B is interposed in the drain line 23.

Figure 2:
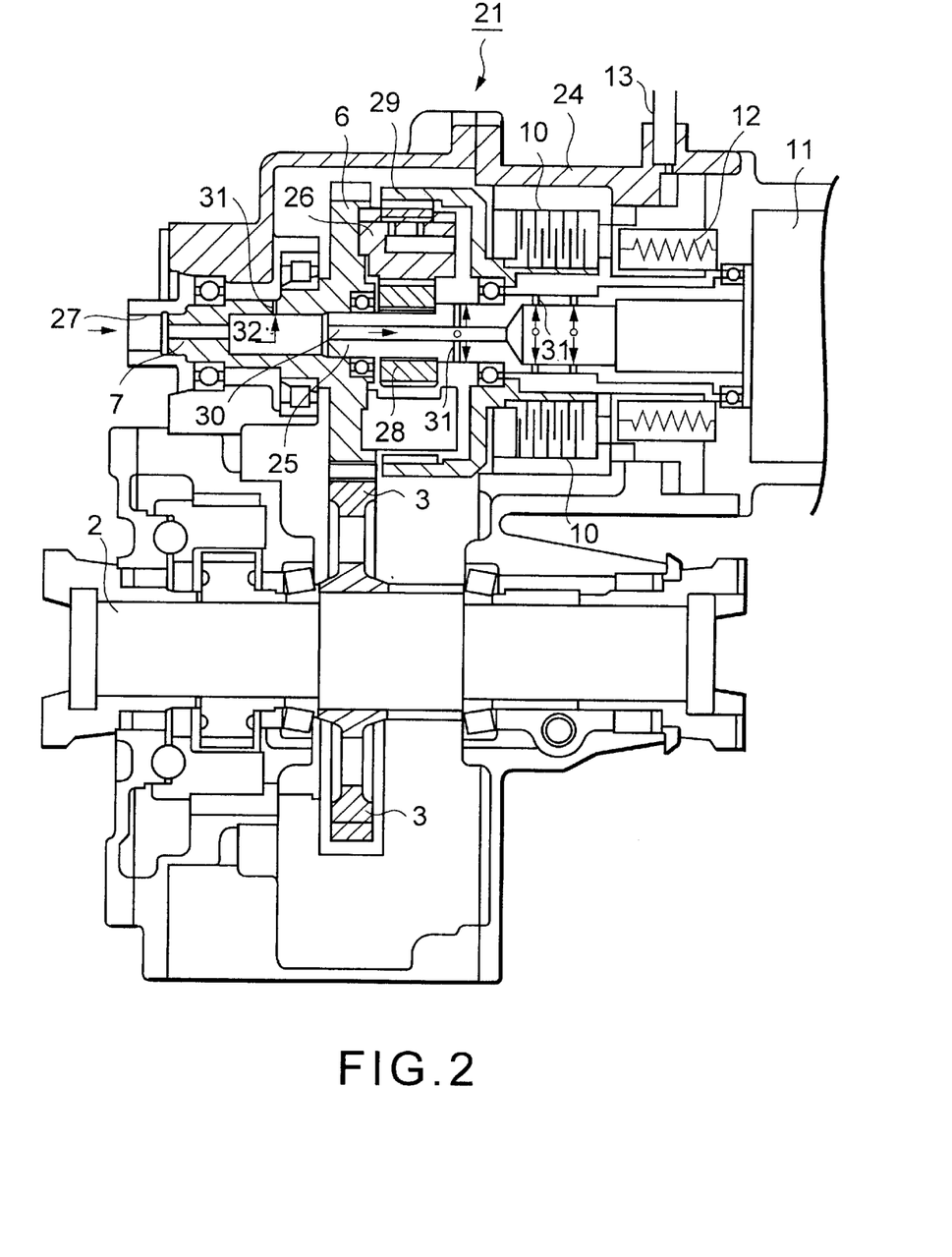
FIG. 2 is a cross sectional view of a planetary gear shown in FIG. 1.

FIG. 2 is a cross sectional view of the planetary gear 21.

In FIG. 2, when the clutch 10 is in an engaged state, the sun gear shaft 25 and the sun gear 28 are rotated in accordance with a rotation of the second hydraulic motor 11. Since the ring gear 29 is fixed to the housing 24 by the clutch 10, the planetary gear 26 is rotated in accordance with the rotation of the sun gear 28, and the second input gear 6 constituting the planet carrier is rotated at a great speed reduction ratio. In accordance with this rotation, the output torque of the second hydraulic motor 11 is transmitted to the output shaft 2 via the output gear 3 engaging with the second input gear 6.

Further, when the clutch 10 is in a broken state, the ring gear 29 is floated with respect to the housing 24, so that the second input gear 6 constituting the planet carrier is not rotated even when the second hydraulic motor 11 is rotated. Accordingly, the structure is made such that the drive force of the second hydraulic motor 11 is not transmitted to the output shaft 2.

Further, a lubricating oil port 27 for introducing the lubricating oil is provided in an end portion of the second input shaft 7 opposite to a side in which the second hydraulic motor 11 is arranged. The lubricating oil input from the lubricating oil port 27 moves rightward as shown by an arrow in FIG. 2 and fills up a space 32 provided in an inner portion of the second input shaft 7.

A part of the lubricating oil leaks out to an external portion from a lubricating small hole 31 provided on an inner wall of the second input shaft 7 and the other enters into an inner portion of the sun gear 25 from a lubricating hole 30 provided in an axial end portion of the sun gear shaft 25 and leaks out to an external portion of the sun gear shaft 25 from the lubricating small hole 31 provided on the inner wall of the sun gear shaft 25. The planetary gear 21 is lubricated by the lubricating oils.

Figure 3:
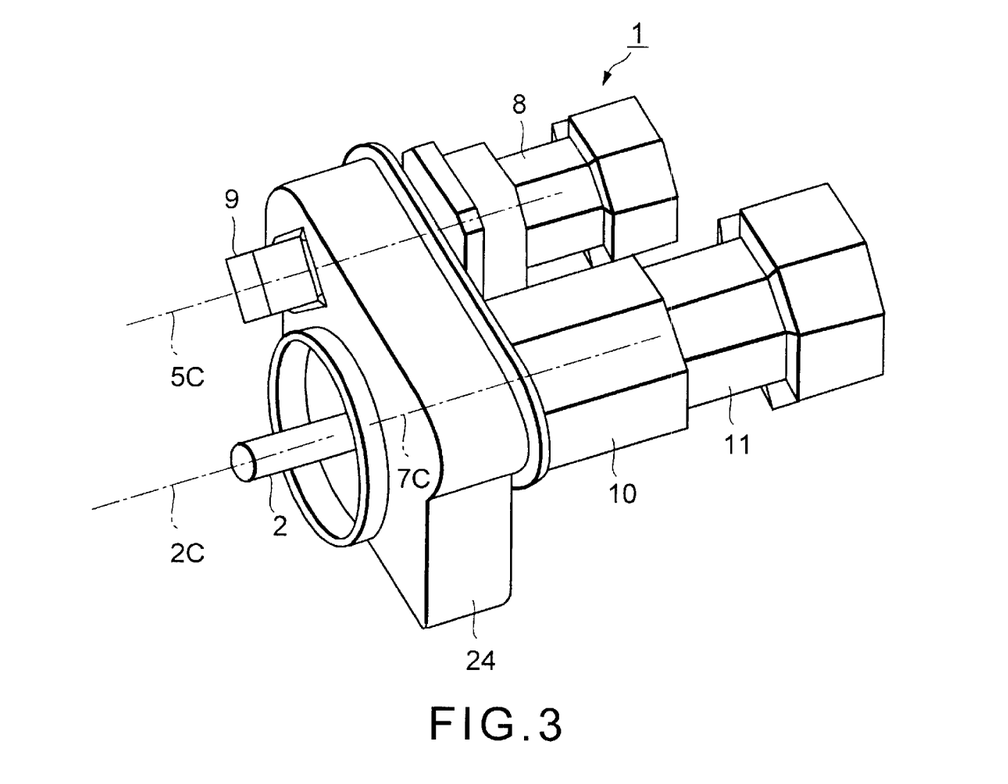
FIG. 3 is an external perspective view of the hydraulic drive apparatus shown in FIG. 1.
Figure 4:
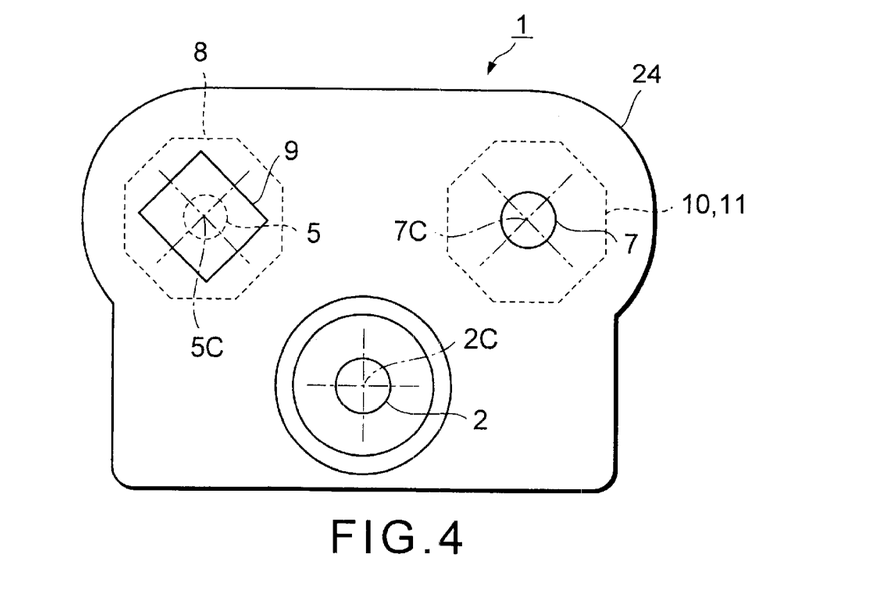
FIG. 4 is a side elevational view of the hydraulic drive apparatus shown in FIG. 3.

FIG. 3 shows an external perspective view of the hydraulic drive apparatus 1 and FIG. 4 shows a side elevational view thereof. As shown in FIGS. 3 and 4, a center shaft 5C of the first input shaft 5 connected to the first hydraulic motor 8 and a center shaft 7C of the second input shaft 7 connected to the second hydraulic motor 11 are respectively arranged in left and right upper portions with respect to a center shaft 2C of the output shaft 2 arranged in a lower portion of the hydraulic drive apparatus 1. That is, three shafts 2, 5 and 7 are arranged so as to form a substantially symmetrical V shape around the output shaft 2.

Next, a description will be given of an operation of the hydraulic drive apparatus 1.

In a low speed mode in which a vehicle speed of the working vehicle is low, since the rotational speed of the first hydraulic motor 8 is low, the oil pressure discharged from the control pump 9 is low, so that the clutch 10 is connected due to the urging force of the spring 12. At this time, the torque of the first hydraulic motor 8 is transmitted to the output shaft 2 via the first input gear 4 and the output gear 3, and the torque of the second hydraulic motor 11 is transmitted to the output shaft 2 via the second input gear 6 and the output gear 3. Accordingly, both of the torque of the first hydraulic motor 8 and the second hydraulic motor 11 is transmitted to the output shaft 2, so that the load 20 is driven by a high torque.

Further, when the vehicle speed V of the working vehicle is increased to a set vehicle speed V2 (this is called as a high speed mode), the discharged oil pressure of the control pump 9 which is increased in correspondence to the increased rotational speed of the first hydraulic motor 8 reaches a set oil pressure. Accordingly, the two position switching valve 14 is opened, the clutch oil pressure P3 becomes over the urging force of the spring 12 and the clutch 10 is broken. As a result, a power transmission from the second hydraulic motor 11 is shut down, and only the first hydraulic motor 8 is connected to the output shaft 2. Since the first hydraulic motor 8 has a characteristic having a high vehicle speed and a low torque, the load is driven at a high vehicle speed and low torque, so that an energy loss at a time of traveling the working vehicle is reduced.

Further, the vehicle speed V of the working vehicle is lowered to a set vehicle speed V1 (V1<V2), the mode is moved from the high speed mode to the low speed mode.

That is, since the rotational speed of the first hydraulic motor 8 is reduced and the two position switching valve 14 is closed, the clutch oil pressure P3 is taken out to the drain 34 through the drain line 23, so that the urging force of the spring 12 overcomes and the clutch 10 is engaged. Accordingly, both of the first hydraulic motor 8 and the second hydraulic motor 11 are connected to the output shaft 2, thereby driving the load 20 at a high torque.

At this time, the clutch oil flowing through the drain line 23 at first flows into the cylinder 33 of the modulation damper 22 in accordance with the engagement of the clutch 10. The oil presses the piston 33B and the flow stops at a portion in front of or at the rear of the piston 33B where the clutch oil pressure P3 and the urging force by the spring 33A are balanced. Thereafter, since the clutch oil pressure P3 is gradually reduced while the oil flows to the drain through the orifice 35, the oil is pressed by the spring 33A so as to be pressed out from the inner portion of the cylinder 33 and taken out to the drain 34.

In accordance with the modulation damper 22 mentioned above, the clutch oil pressure is at first reduced at a high speed and thereafter, is gradually reduced at a slow speed. Accordingly, it is possible to prevent the clutch 10 from suddenly engaging, a shock due to the engagement is softened and a ride feeling is improved.

As mentioned above, the hydraulic drive apparatus 1 in accordance with the present embodiment is structured such that the output shaft 2 connected to the load 20 and the first input shaft 5 are connected by the output gear 3 and the first input gear 4 engaged with the output gear 3 without disposing the other shafts therebetween. Further, the output shaft 2 and the second input shaft 7 are connected to the output gear 3 and the second input gear 6 engaged with the output shaft 3 without disposing the other shafts therebetween.

Accordingly, it is possible to independently set the speed reduction ratio of the first input shaft 5 and the second input shaft 7 with respect to the output shaft 2, respectively. Therefore, it is possible to select the speed reduction ration suitable to each of the first hydraulic motor 8 having a high vehicle speed and a low torque and the second hydraulic motor 11 having a low vehicle speed and a high torque, so that an energy efficiency of the working vehicle is improved.

Further, the planetary gear 21 is interposed between the second hydraulic motor 11 having a low vehicle speed and a high torque and the output shaft 2. Accordingly, the speed reduction ratio from the second hydraulic motor 11 to the output shaft 2 becomes significantly large in comparison with the spur gear, and it is possible to make the second hydraulic motor 11 compact. Further, since the planetary gear 21 can change the speed reduction ratio without largely changing the outer diameter thereof, it is possible to set an optimum speed reduction ratio with respect to the first and second hydraulic motors 8 and 11. For example, even in the case that the specification of the existing hydraulic motor does not have a torque having a magnitude required for the working vehicle, it is possible to obtain a desired torque by changing the speed reduction ratio.

Further, the clutch 10 for engaging and breaking between the second hydraulic motor 11 and the output shaft 2 is provided between the ring gear 29 of the planetary gear 21 and the housing 24. Since the ring gear 29 has a low peripheral speed and has a little difference of speed with respect to the housing 24, an abrasion generated at a time of engaging the clutch 10 becomes small and a service life of the clutch 10 becomes long, and further since the shock of the engagement is small, a comfortable drive performance is improved.

Further, the first and second hydraulic motors 8 and 11 are arranged in substantially symmetrical around the output shaft 2 arranged at a substantially center in a lateral direction of the working vehicle, the output shaft 2 is arranged at a lower center and the first and second input shafts 5 and 7 are respectively arranged in left and right upper portions, whereby these elements are arranged so as to form a V shape.

In accordance with the structure mentioned above, the hydraulic drive apparatuses 1 are arranged in laterally symmetrical with respect to the center in the lateral direction of the working vehicle, so that a weight balance is improved. Further, the lateral size of the hydraulic drive apparatus with respect to the center of the working vehicle is not shifted to any one side of the lateral direction, and it is easy to receive the hydraulic drive apparatus in the inner portion of the working vehicle. Further, since a height of the hydraulic drive apparatus 1 is reduced in comparison with the case of arranging the first input shaft 5 and the second input shaft 7 in series in a vertical direction with respect to the output shaft 2, it is possible to constitute the hydraulic drive apparatus 1 in a compact manner.

Further, the lubricating oil port 27 for taking in the lubricating oil for lubricating the planetary gear 21 is provided in the axial end portion of the second input shaft 7. Accordingly, in comparison with the lubricating means structured such as to soak the planetary gear 21 into the oil tank, a drive force loss at a time when the planetary gear 21 mixes the lubricating oil within the oil tank is reduced, and an energy efficiency of the working vehicle is improved.

The clutch 10 is a negative clutch. Accordingly since the clutch 10 is always in an engaged state even in the case that the engine or the oil pump is stopped during the travel, the hydraulic motors 8 and 11 become a brake and can reduce the speed of the working vehicle.

Further, the modulation damper 22 is provided in the drain line 23 in which the two position switching valve 14 is closed at a time of engaging the clutch 10 and the clutch oil pressure P3 is taken out. Accordingly, since the clutch oil pressure P3 is gradually taken out, the clutch 10 is not suddenly engaged, the shock at a time of engaging the clutch 10 is softened and the ride feeling is improved.

In addition, the control pump 9 for controlling the clutch oil pressure P3 is connected to the first input shaft 5 connecting the first hydraulic motor 8. Accordingly, it is possible to directly drive the control pump 9 from the first input shaft 5, the shaft or the gear for driving the control pump 9 is not independently required, and the structure of the hydraulic drive apparatus 1 for the working machine becomes simple and compact.

Here, a description will be in detail given of an operation of the modulation damper 22 in accordance with the present embodiment.

Figure 5:
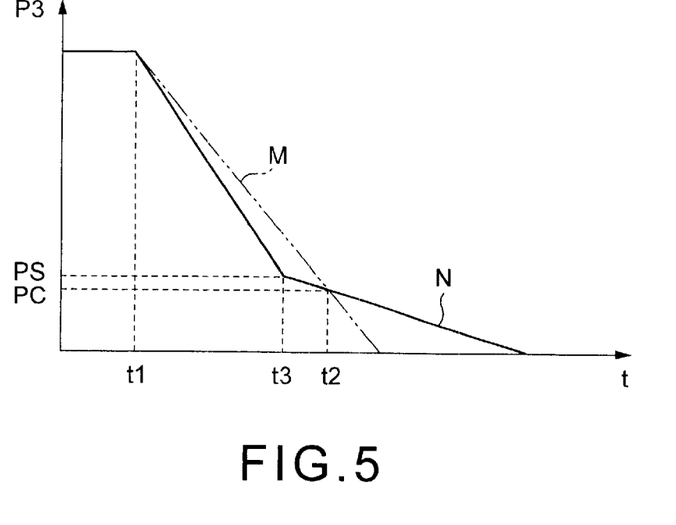
FIG. 5 is a graph showing a change with the passage of time of a clutch pressure P3.

FIG. 5 shows a change with the passage of time of the clutch pressure P3 at a time when the clutch 10 is engaged. In FIG. 5, a two-dot chain line M shows the clutch pressure P3 in the case that the modulation damper 22 shown in FIG. 10 is not included, and a solid line N shows the clutch pressure P3 in the case that the modulation damper 22 is included.

As shown in the solid line N in FIG. 5, between a time t1 and a time t3 immediately before a time t2, the clutch oil flows into the cylinder 33 as mentioned above. Accordingly, the clutch pressure P3 is suddenly lowered in the same manner as the case of the two-dot chain line M where the modulation damper 22 is not included (in FIG. 5, slightly faster).

Then, at the time t3, since the flow of the clutch oil is stopped by the urging force of the spring 33A and the clutch oil flows to the drain 34 through the orifice 35 having a small cross sectional area, a descending incline of the clutch pressure P3 becomes gentle. Accordingly, near the time t2, since the clutch pressure P3 and the urging force of the spring 12 are gradually close to each other and the magnitude thereof is inverted, the clutch 10 is slowly engaged and a shock at a time of engagement can be reduced.

Further, the time t2 at which the clutch is engaged in the solid line N becomes substantially the same as the time t2 in the two-dot chain line M. That is, it is possible to engage the clutch at a desired timing so as to obtain a torque required for the working vehicle.

At this time, a clutch pressure PS at the time t3 is expressed by the following formula (1).

$$PS = F/A \qquad (1)$$

In the formula (1), reference symbol F denotes an urging force of the spring 33A and reference symbol A denotes a cross sectional area of the piston 33B. That is, the urging force of the spring 33A and the cross sectional area A of the piston 33B may be set so that the clutch pressure PS is slightly greater than the clutch pressure PC at a time of engagement.

As mentioned above, since the clutch pressure P3 is slowly reduced before the clutch 10 is engaged, the clutch pressure P3 and the urging force of the spring are gradually close to each other, so that the clutch 10 is not suddenly engaged. Accordingly, a shock at a time of engagement,can be reduced, a service life of the clutch 10 can be increased and a ride feeling of the working vehicle is improved.

Further, since the structure is made such that clutch P3 is at first suddenly taken out, a long time is not required before the clutch 10 is engaged, and the clutch 10 can be engaged at a desired timing. Accordingly, no trouble is generated in the travel of the working vehicle and a stable operation can be performed.

In this case, in the present embodiment, the clutch 10 is provided between the ring gear 29 of the planetary gear 21 and the housing 24 of the hydraulic drive apparatus 1, however, the structure is not limited to this.

Figure 6:
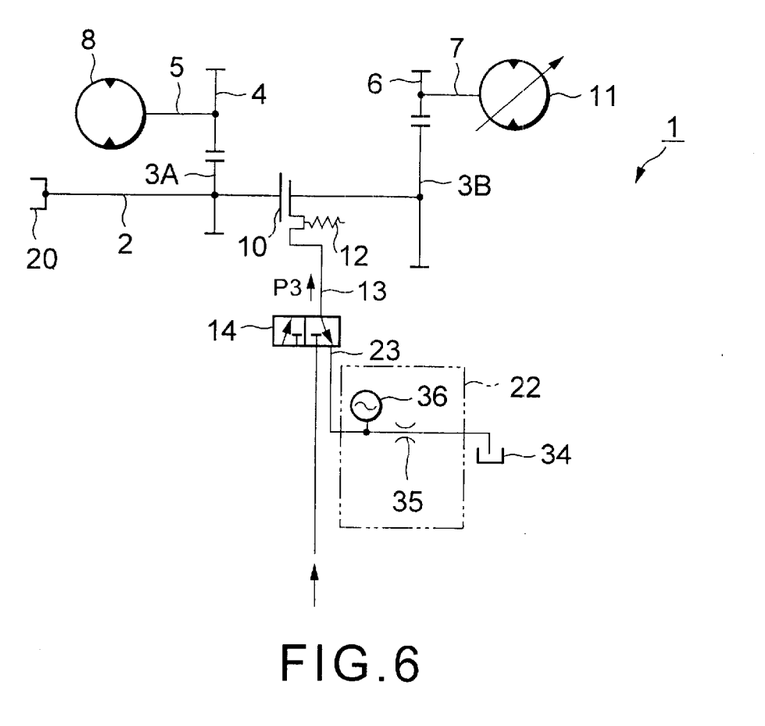
FIG. 6 is a skeleton view of a hydraulic drive apparatus in accordance with a second embodiment.

Next, a description will be given of a second embodiment. FIG. 6 is a skeleton view of a hydraulic drive apparatus in accordance with a second embodiment. In FIG. 6, the hydraulic drive apparatus 1 is provided with the output shaft 2 connected to the load 20, a first output gear adhered to the output shaft 2, a second output gear 3B freely engaged with the output shaft 2 by the clutch 10, the first input gear 4 engaged with the first output gear 3A, the second input gear engaged with the second output gear B, the first input shaft 5 to which the first input gear 4 is adhered, and the second input shaft 7 to which the second input gear 6 is adhered.

The first hydraulic motor 8 having a high vehicle speed and a low torque is connected to the axial end portion of the first input shaft 5 and the second hydraulic motor 11 having a low vehicle speed, a high torque and a variable discharge pressure is connected to the axial end portion of the second input shaft 7.

The first hydraulic motor 8 and the second hydraulic motor 11 are connected to the hydraulic pump via a hydraulic parallel circuit and is driven by the discharged pressurized oil.

The hydraulic drive apparatus 1 engages the clutch 10 at a time of low speed travel so as to connect both of the first hydraulic motor 8 and the second hydraulic motor 11 to the output shaft 2, thereby performing an operation. Further, the hydraulic drive apparatus 1 breaks the clutch 10 at a time of high speed travel so as to perform the travel by the first hydraulic motor 8.

The clutch 10 is normally in an engaged state due to the urging force of the spring 12, and is broken by the clutch pressure P3 supplied from the oil pressure source (not shown) via the oil passage 13.

At a time of moving to the low speed travel from the high speed travel, the two position switching valve 14 is closed by a control apparatus (not shown). Accordingly, in the same manner as that of the first embodiment, the clutch oil is taken out to the drain 34 through the drain line, and the urging force of the spring 12 overcomes, so that the clutch 10 is engaged. Therefore, both of the first hydraulic motor 8 and the second hydraulic motor 11 are connected to the output shaft 2, thereby driving the load 20 at a high torque.

At this time, an accumulator 36 filled with gas in an inner portion thereof and the modulation damper 22 provided with the orifice 35 are interposed in the drain line 23. The clutch oil flowing through the drain line 23 flows into the accumulator 36 of the modulation damper 22, and the flow is stopped in a portion where the clutch pressure P3 and a pressure of the gas charged in the inner portion are balanced. Thereafter, since the clutch pressure P3 is gradually reduced while the oil flows to the drain through the orifice 35, the oil is pressed by the gas pressure, pressed out from the inner portion of the accumulator 36 and taken out to the drain 34.

In accordance with the structure mentioned above, since the clutch 10 is slowly engaged, a shock at a time of engagement is reduced, a ride feeling of the working vehicle is improved and a service life of the clutch 10 is increased. Further, since the clutch pressure P3 is at first suddenly reduced, the clutch 10 is engaged at a desired timing without delaying the timing. Accordingly, no trouble is generated in the travel of the working vehicle and a stable operation can be performed.

In this case, in the present embodiment, the first hydraulic motor 8 may be structured such as to have a variable discharge pressure.

Figure 7:
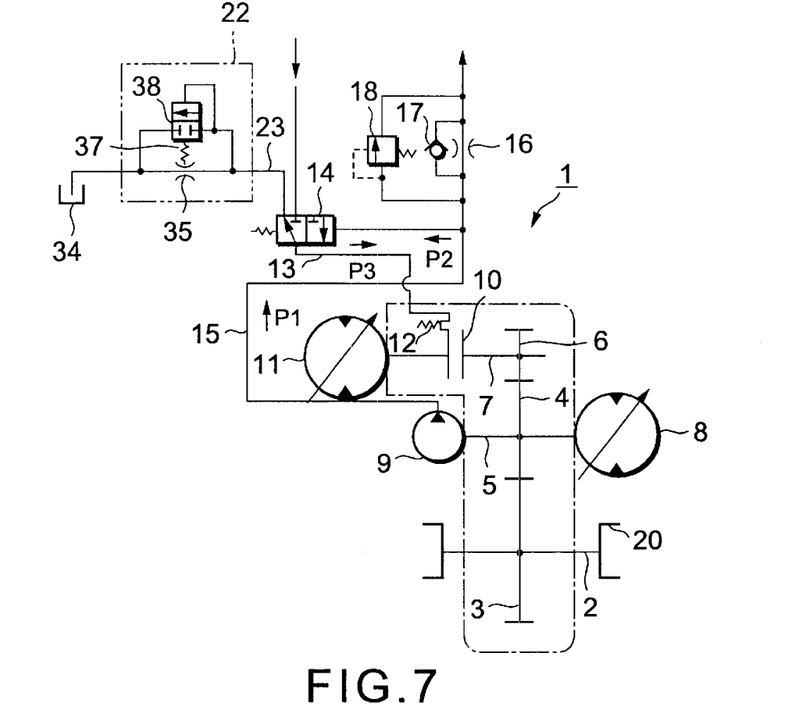
FIG. 7 is a skeleton view of a hydraulic drive apparatus in accordance with a third embodiment.

Next, a description will be given of a third embodiment. FIG. 7 is a skeleton view of a hydraulic drive apparatus in accordance with the third embodiment.

In FIG. 7, the hydraulic drive apparatus 1 has the same structure as that of the conventional art shown in FIG. 9. That is, the hydraulic drive apparatus 1 is provided with the output gear 3 adhered to the output shaft 2, the first input gear 4 engaged with the output gear 3, the first input shaft 5 to which the first input gear 4 is adhered, the second input gear 6 engaging with the first input gear 4, and the second input shaft 7 to which the second input gear 6 is adhered.

The first hydraulic motor 8 having a high vehicle speed and a low torque is connected to one end side portion of the first input shaft 5 and the control pump 9 is connected another end side portion thereof, respectively. The second hydraulic motor 11 having a low vehicle speed and a high torque is connected to the axial end portion of the second input shaft 7 via the clutch 10.

In the hydraulic drive apparatus 1 mentioned above, the modulation damper 22 having the orifice 35 and a switching valve 38 for switching the operation in accordance with the urging force of a spring 37 and the magnitude of the clutch pressure P3 flowing through the drain line 23 is interposed in the drain line 23 of the two position switching valve 14.

In the present embodiment, when the working vehicle travels at a high speed, the switching valve 38 is in a closed state as shown in FIG. 7 due to the urging force of the spring 37. Further, when the working vehicle moves from the high speed travel to the low speed travel, the clutch pressure P3 flowing through the drain line 23 overcomes the urging force of the spring 37 and the switching valve 38 is opened. Accordingly, the clutch pressure P3 passes through the switching valve 38 and the clutch pressure P3 is suddenly lowered.

Further, when the clutch pressure P3 is lowered, the urging force of the spring 37 overcomes, the switching valve 38 is closed, and the clutch oil flows to the drain 34 through the orifice 35, so that the clutch pressure P3 is gradually reduced and the clutch 10 is gently engaged.

As mentioned above, the modulation damper 22 in accordance with the present invention can be applied to the hydraulic drive apparatus 1 in accordance with the conventional art.

Figure 8:
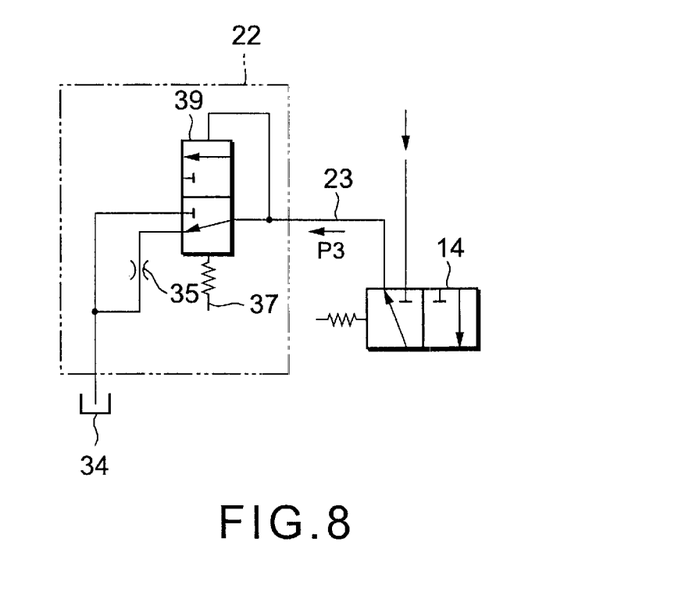
FIG. 8 is a view showing another embodiment of a modulation damper shown in FIG. 7.

FIG. 8 shows another embodiment of the modulation damper 22. In FIG. 8, the modulation damper 22 has the orifice 35 and a switching valve 39 which switches an operation in accordance with the urging force of the spring 37 and the magnitude of the clutch pressure P3 flowing through the drain line 23.

When the clutch is in an engaged state, the switching valve 39 is in a closed state due to the urging force of the spring 37, and the oil flowing through the drain line 23 flows to the drain 34 through the orifice 35 as shown in FIG. 8. When the working vehicle moves from the high speed travel to the low speed travel so as to engage the clutch 10, the two position switching valve 14 is opened and the clutch pressure P3 flowing through the drain line 23 is increased, thereby opening the switching valve 39, no that the drain line 23 is directly connected to the drain 34. Accordingly, the clutch oil flows into the drain 34 at a great flow rate, and the clutch pressure P3 is suddenly reduced.

Further, when the urging force of the spring 37 overcomes the clutch pressure P3, the switching valve 39 is closed, so that the clutch oil flows to the drain 34 through the orifice 35, the flow rate is reduced and the clutch 10 is slowly engaged.

As mentioned above, in accordance with the present invention, the modulation damper 22 structured such that the clutch pressure P3 is suddenly lowered before the clutch 10 is engaged and is slowly lowered at a time of engagement is provided in the drain line 23 of the two position switching valve 14 for controlling the engagement of the clutch 10.

Accordingly, it is possible to slowly engage the clutch 10 at a desired timing, and a operability of the working vehicle is improved.

Further, since the hydraulic drive apparatus can be structured only by the hydraulic circuit and an electrical control system such as a controller or the like is note required, the structure of the hydraulic drive apparatus for the working machine becomes simple and compact.

In this case, it is a matter of course that a combination of the hydraulic drive apparatus 1 and the modulation damper 22 described in each of the embodiments is not limited to this. For example, it is possible to provide with the modulation damper 22 described in the second embodiment in the hydraulic drive apparatus 1 described in the first embodiment.

What is claimed is:

1. A hydraulic drive apparatus for a working machine having:
   variable capacity type first hydraulic motor and second hydraulic motor;
   a first input shaft connected to the first hydraulic motor; and
   a second input shaft freely engaged with the second hydraulic motor, said hydraulic drive apparatus transmitting an output torque of the first hydraulic motor and the second hydraulic motor to an output shaft,
   wherein said output shaft is connected to the first input shaft, the output shaft is connected to the second input shaft respectively via a train of gears,
   a planetary gear is interposed between the second hydraulic motor and the second input shaft, and
   a clutch freely engaging the second hydraulic motor with the second input shaft is provided between the second hydraulic motor and the planetary gear.

2. A hydraulic drive apparatus for a working machine as claimed in claim 1, wherein center axes of the first input shaft and the second input shaft are arranged in left and right upper portions of the center axis of said output shaft in a symmetrical manner.

3. A hydraulic drive apparatus for a working machine as claimed in claim 1, wherein a lubricating oil port introducing a lubricating oil for lubricating said planetary gear is provided in an end portion of the second input shaft opposite to the second hydraulic motor.

4. A hydraulic drive apparatus for a working machine as claimed in any one of claims 1 to 3, wherein said clutch is a negative clutch and a modulation damper for preventing a clutch oil pressure (P3) from being suddenly taken out is provided in a drain line for taking out the clutch oil pressure of the clutch.

5. A hydraulic drive apparatus for a working machine as claimed in claim 1 or 2, wherein a control pump for controlling said clutch oil pressure (P3) is connected to an end portion of the first input shaft opposite to the first hydraulic motor.

6. A hydraulic drive apparatus for a working machine having:
   first hydraulic motor and second hydraulic motor;
   a first input shaft connected to the first hydraulic motor;
   a second input shaft connected to the second hydraulic motor so as to be freely engaged by a clutch being controlled by a switching valve; and
   an output shaft connected to the first input shaft and the second input shaft via a gear train, said hydraulic drive apparatus transmitting an output torque of the first hydraulic motor and the second hydraulic motor to the output shaft,
   wherein a modulation damper for suddenly reducing the clutch pressure (P3) before engagement of said clutch and slowly reducing the clutch pressure at a time of engagement is provided in a drain line of the switching valve.

7. A hydraulic drive apparatus for a working machine as claimed in claim 6, further comprising a control pump driven by the first hydraulic motor via the first input shaft or said gear train, and a switching valve for controlling an engagement of said clutch on the basis of an oil pressure (P1) discharged by the control valve.

* * * * *